June 6, 1933. W. H. D. BROUSE 1,912,687
DISPLACEMENT METER FOR MEASURING FLUIDS
Filed March 8, 1930 3 Sheets-Sheet 1

Inventor.
William H. D. Brouse

June 6, 1933.  W. H. D. BROUSE  1,912,687

DISPLACEMENT METER FOR MEASURING FLUIDS

Filed March 8, 1930   3 Sheets-Sheet 2

Inventor.
William H. D. Brouse.

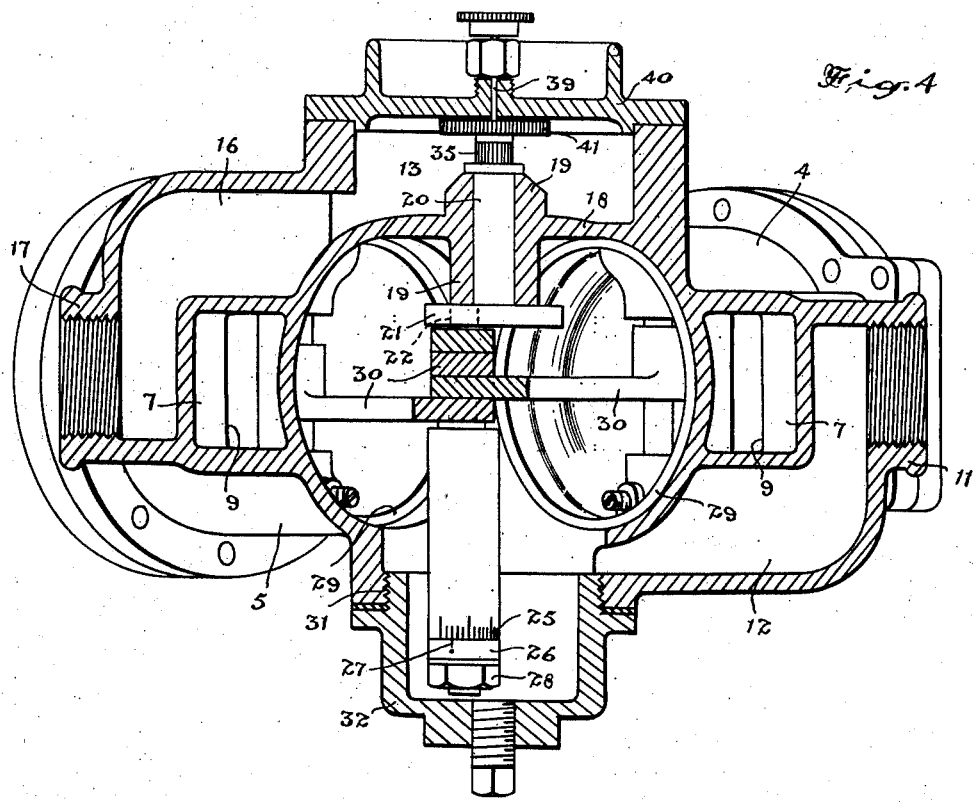
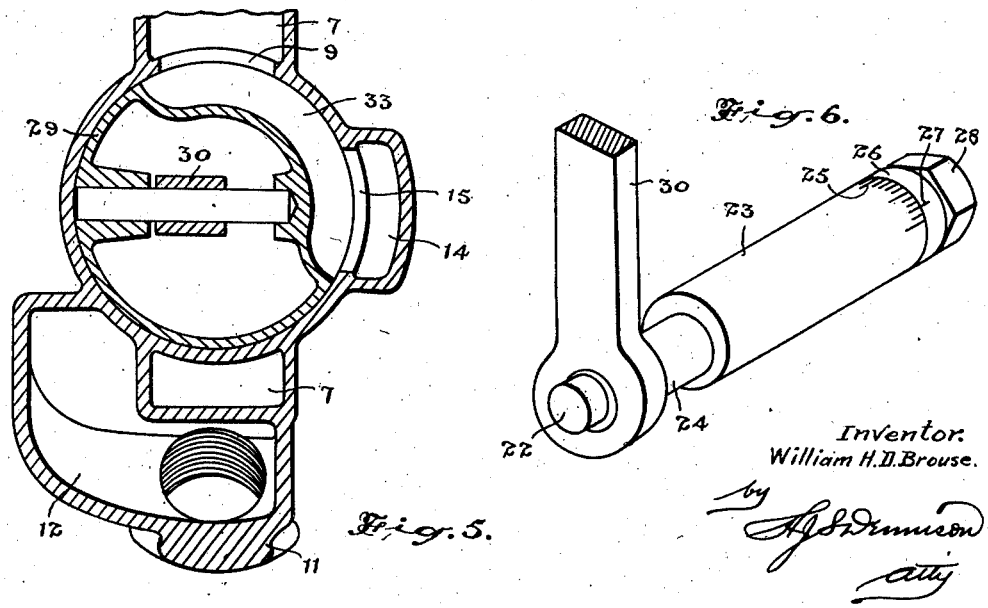

Patented June 6, 1933

1,912,687

UNITED STATES PATENT OFFICE

WILLIAM H. D. BROUSE, OF TORONTO, ONTARIO, CANADA, ASSIGNOR TO SERVICE STATION EQUIPMENT COMPANY, LIMITED, OF TORONTO, ONTARIO, CANADA

DISPLACEMENT METER FOR MEASURING FLUIDS

Application filed March 8, 1930. Serial No. 434,385.

The principal objects of the invention are, to provide a mechanical means for accurately measuring fluids while being dispensed, and to devise a piston type of meter which may be very closely adjusted and which will measure the fluid accurately as it passes therethrough at varying speeds of discharge.

The present invention relates to meters of the type in which the measurement of the fluid is determined by the displacement of pistons within chambers through which the fluid is directed and it is an important feature that a substantially uniform fluid pressure is maintained on both ends of the pistons while the fluid displacement is being effected to minimize the tendency to leakage past the pistons, the pump pressure forcing the fluid continuously through the meter against a low head pressure and merely displacing the pistons in its travel.

Another feature of the invention consists in having the several pistons connected to a common crank member journalled in axial relation to the series of piston chambers, an adjustable eccentric surface being arranged on said crank pin to enable an accurate adjustment of the crank throw and the consequent displacement of the pistons, so that, regardless of inaccuracies of workmanship or construction, the meter may be very accurately calibrated.

The principal feature of the invention consists in the novel construction and arrangement of parts, whereby the fluid is directed consecutively into a plurality of measuring cylinders, the volume being positively controlled by valving pistons operating in said cylinders and connected to a crank which operates the indicating device.

The preferable manner of utilizing this invention is to effect the displacement of the pistons by the pressure of the fluid being measured, but it must be understood that the same structure may be utilized to both pump and measure the fluid, it being merely necessary to apply the driving force to the gear mechanism connected with the crank.

A further and very important feature of the invention consists in the novel arrangement of an eccentric sleeve upon the crank pin of the measuring mechanism having a graduated gauge thereon cooperating with a fixed indicating mark to enable the accurate and coincident adjustment of the several measuring pistons.

In the drawings, Figure 1 is a plan view of my improved meter.

Figure 4 is a vertical sectional view through the line 4—4 of Figure 2.

Figure 5 is a transverse vertical sectional view through the line 5—5 of Figure 2.

Figure 6 is a perspective detail of the eccentric crank adjusting device.

Figure 3:
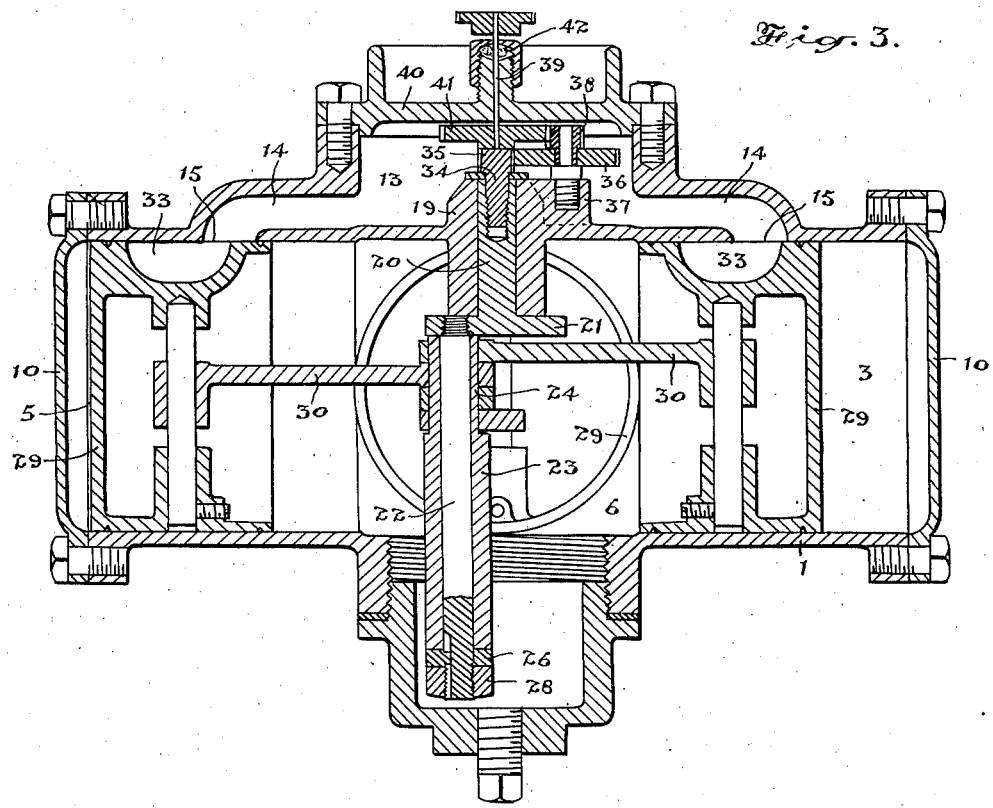
Figure 3 is a vertical sectional view through the line 3—3 of Figure 2.
Figure 1:
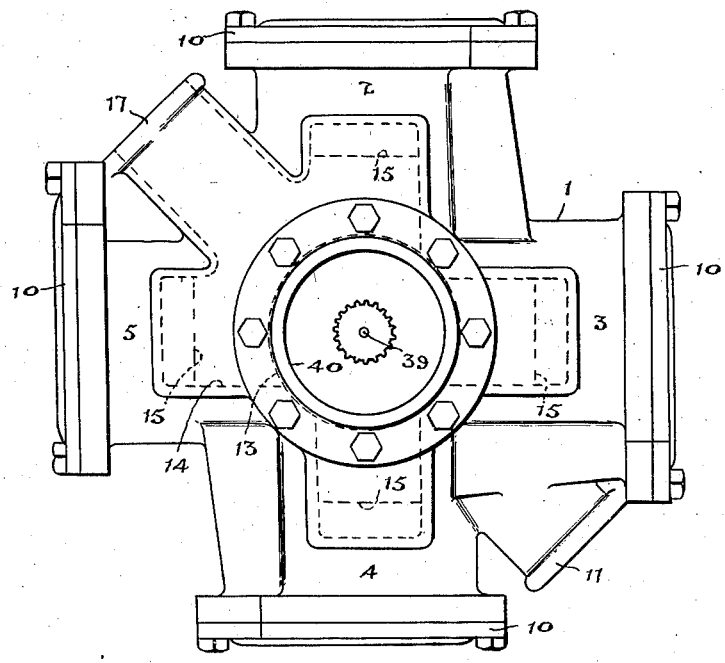

Referring to the accompanying drawings the meter casing 1 is here shown formed with the cylinders 2, 3, 4, 5 arranged in diametrically opposite pairs opening to a central chamber 6. Each cylinder has formed on one side thereof a duct 7 (see Figure 2) communicating with a port 8 at the outer end and leading to a port 9 adjacent to the inner end of the adjacent cylinder. The outer end of each cylinder is closed by a cap 10 which extends past the port 8 and closes the outer end of the duct 7.

A boss 11 arranged between the cylinders 3 and 4 encloses a duct 12 which leads into the central chamber 6 and is connected to a pipe leading from the feed pump which directs a constant flow of the fluid to be measured into the chamber 6.

The meter is adapted to operate with the cylinders in a horizontal plane and a chamber 13 is formed on the top side of the casing 1 and is provided with a plurality of ducts 14, one for each cylinder and each leading to a port 15 arranged intermediate of the length of the wall of the respective cylinder and opening therethrough.

A duct 16 arranged in the top wall of the casing between the cylinders 2 and 5 leads through a boss 17 which is connected to a discharge pipe.

The inner wall 18 of the chamber 13 has formed thereon a boss 19 in which a crank shaft 20 is journalled said shaft having a crank disc 21 at its inner end within the central chamber 6. A crank pin 22 is mounted on the crank disc and extends across the chamber 6 and is threaded on its outer end.

A sleeve 23 is rotatably mounted on the pin 22 and the inner end 24 thereof is formed of a reduced diameter which is eccentric to the axis of the pin. A series of indicating marks 25 are arranged on the periphery of the sleeve 23 at its outer end. A lock washer 26 is non-rotatably keyed on the threaded end of the pin 22 and has an indicating mark 27 on its periphery. A lock nut 28 is threaded on the threaded end of the pin 22 and engages the washer 26 to clamp the sleeve 23 against the crank disc 21 and hold it in adjusted positions.

Pistons 29 are mounted one in each of the cylinders and are connected by the connecting rods 30 to the eccentric end 24 of the sleeve 23 carried by the crank pin. The arrangement of the connecting rods on the eccentric sleeve enables a very accurate adjustment of the piston being made within the cylinders to regulate the stroke and displacement of the pistons and consequently the volume of discharge from the cylinders.

An opening 31 is provided in the bottom side of the casing 1 through which the adjusting end of the crank member extends to permit of ready access thereto and said opening is closed by a cap 32.

Each of the pistons 29 is formed with a recess 33 which extends part way around the circumference and is adapted to register concurrently with the port 9 and port 15 of the cylinder in which it is arranged to form a communicating passage from the outer end of the cylinder adjacent thereto in the direction reverse to the direction of operation of the device through the duct 7, recess 33 and duct 14 to the chamber 13.

Figure 2:
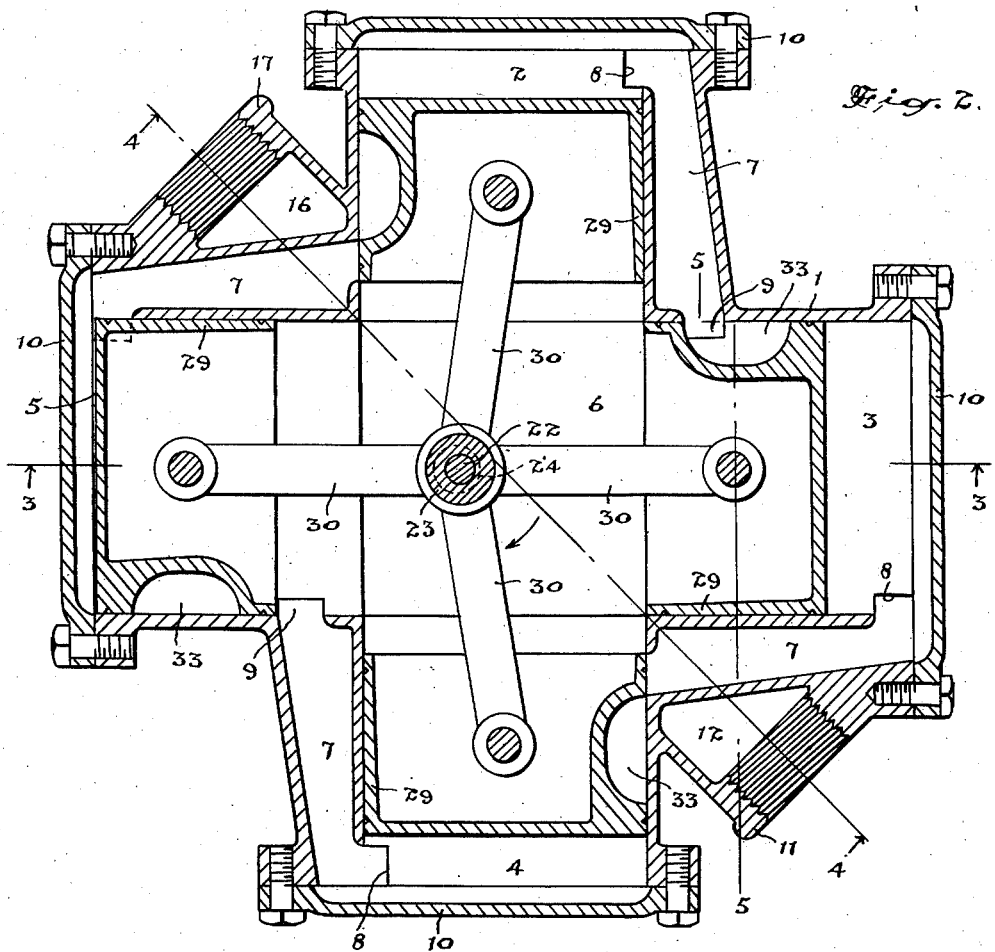
Figure 2 is an enlarged horizontal part mid-sectional elevation.
Figure 7:
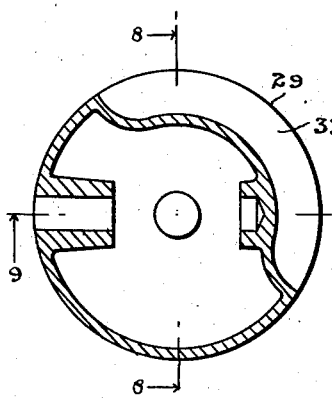
Figure 7 is a cross sectional view of one of the pistons.
Figure 8:
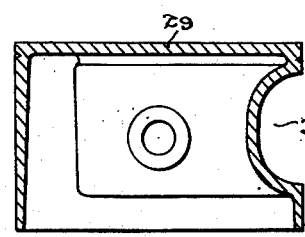
Figure 8 is a longitudinal sectional view through the piston on the line 8—8 of Figure 7.
Figure 9:
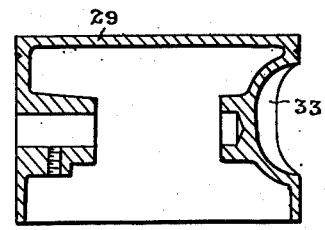
Figure 9 is a longitudinal sectional view through the piston on the line 9—9 of Figure 7.

It will be seen that in the position of the parts as shown in Figure 2 the piston in cylinder 5 is at the outward end of its stroke and the port 9 leading to cylinder 4 is open to the chamber 6 and the fluid which fills the chamber 6 under the pressure of the feed pump flows through the duct 7 and port 8 into the cylinder 4.

The duct 7 of cylinder 2 is open to discharge consequently the greater pressure of the fluid against the inner end of the piston in cylinder 2 moves same outwardly rotating the crank shaft and causing the piston in the cylinder 2 to uncover the port 9 leading to cylinder 5 permitting the fluid to flow through the duct 7 to the outer end of the cylinder to fill same as the piston therein moves inwardly through the operation of the crank.

The piston in cylinder 3 being now at the inward end of its stroke the port 9 of cylinder 2 is open to the peripheral recess 33 in the side wall of the piston and the fluid in the cylinder 2 is thus discharged by the continued outward movement of the piston in cylinder 2 through the port 8, duct 7, port 9, recess 33 in the piston of the cylinder 3 and the port 15 in the top side of the cylinder wall to the chamber 13 from whence it flows through the discharge duct 16.

As the piston of cylinder 2 reaches the outward end of its stroke the piston in cylinder 3 closes the port 9 to the discharge and opens said port 9 to the central inlet or pressure chamber 6 and since the length of the piston skirt between the wall of the recess 33 and the bottom of the piston is substantially equal to the width of the port 9, the closing of the port 9 to the recess 33 will be followed immediately by the opening of the port 9 to the chamber 6. This is clearly illustrated by the arrangement of the pistons in cylinders 2 and 4.

Each cylinder in succession is first opened to the inlet pressure then closed to the inlet and immediately thereafter opened to the discharge then closed to discharge and immediately thereafter opened to inlet; that is to say, the opening of the port 9 to inlet is instantaneous, with their being closed to discharge and vice versa with the result that the feed pressure operates the pistons successively and the discharge is accurately measured by each reciprocation of the pistons. The movement of the crank shaft is smooth and uniform and the rotative movement is utilized to operate an indicating device.

In the construction herein shown a stud 34 is secured in the end of the crank shaft extending through the boss 19 and carries a gear pinion 35. A gear wheel 36 mounted on a stud 37 fixed in the boss 19 of the casing meshes with the pinion 35 and carries a pinion 38.

A spindle 39 rotatably mounted in the cap 40 which closes the chamber 13 has secured to its inner end a gear wheel 41 meshing with the pinion 38 and is driven at a speed considerably reduced from the speed of rotation of the crank shaft 20 and it has connected to its outer end any suitable form of indicating device.

The spindle 39 is packed with a suitable stuffing box 42.

The mechanism described is extremely accurate, each piston operates a definite distance and each movement represents a definite volumetric displacement of fluid and therefore discharges at each stroke a definite quantity of fluid and by the calibrated adjustment provided by the eccentric sleeve on the crank pin the quantity of fluid delivered per revolution of the crank shaft may be most accurately regulated. There is no appreciable loss through leakage of the fluid between the pistons and the cylinder walls as the pressure within the chamber 6 is uniform against the inner ends of all the pistons at all times and this pressure is open to the piston heads while the ports 9 are open and as the point of closing of said ports to the pressure of the fluid in the chamber 6 is instantaneous with the opening of the same ports to the discharge there is practically no movement of the pistons against a stationary or dead fluid, that is to say, immediately the ports 9 are closed to the inflow pressure they are opened to the discharge pressure and these pressures differ only in relation to the head pressure. In other words, the pistons and other operating parts are nicely balanced and their operation is merely to follow the flow of the fluid and in their idling operation they turn a shaft which carries an indicating finger.

It will be noted that the surface area of each of the pistons engaging in operating contact with the cylinders is considerably less on the side of the pistons wherein the recesses 33 are arranged and as such recesses are opened to the discharge pressure, which is slightly lower than the pump pressure, the pump pressure acting against the fuller area on the opposite side of the piston to the recess 33 tends to force the side of the piston having the recess into tighter close mechanical contact than on the opposite side. This pressure balances the sealing effect of the piston as the surface area not cut by the recess 3 maintains a fluid-filmed seal while the portion at either end of the recess 33 is held in close engaging contact with the cylinder.

It is found in practice that the measurement of the meter is exceedingly accurate and remains so over long periods of use, consequently there can be no appreciable leakage of the fluid past the pistons.

Further, this meter operates equally accurate at various speeds of discharge and with any free flowing fluid. All the parts are of simple and sturdy construction and there are no delicate mechanisms to become strained or rendered inaccurate and the parts are not called upon to work under a heavy strain or load due to the substantial balancing influence of the fluid.

The meter is herein shown and described as having the fluid directed into the chamber 6 and discharged from the chamber 13 but the direction of flow may be reversed if desired.

What I claim as my invention is:

1. In combination a fluid inlet chamber, a plurality of cylinders spaced around said chamber and open thereto at one of their ends, there being ducts connecting said inlet chamber with the other ends of said cylinders, an outlet chamber having a port opening to each of said cylinders, separately operable valving pistons arranged in said cylinders and opening and closing the ducts leading from the inlet chamber to the other ends of said cylinders and opening and closing the ports leading to said outlet chamber, a shaft rotatably supported on a fixed axis and having a crank, connecting rods separately connecting said crank with each of said pistons, said crank imparting through said connecting rods consecutively corresponding motions in circumferential progression to determine the co-operation of said pistons with said ducts and ports to control the flow of fluid to and from said cylinders in consecutive rotation, and means for adjusting the throw of said crank to progressively regulate the distance of travel of the pistons.

2. In a fluid meter, a fluid inlet chamber, a plurality of measuring cylinders spaced around said inlet chamber and open at one end thereto, an outlet chamber having a port opening in each of said cylinders, said cylinders each having a duct connecting one end with the opposite end of the next adjacent cylinder, separately operable valving pistons arranged one in each of said cylinders and co-operating with said ports and ducts to open and close the same, connecting rods connected one to each of said pistons, a shaft rotatably supported on a fixed axis and having a crank operating in said inlet chamber and connected directly to the inner ends of said connecting rods, means mounted on and carried bodily by said crank for minutely adjusting the throw of the pistons and to regulate the volumetric discharge from the cylinders, and means operated by said crank adapted to be connected to means for indicating the volume flow of the fluid.

3. In a fluid meter, a fluid inlet chamber, a plurality of measuring cylinders spaced around said inlet chamber and open at one end thereto, an outlet chamber having a port opening in each of said cylinders, said cylinders each having a duct connecting one end thereof with the opposite end of the next adjacent cylinder, separately operable valving pistons arranged one in each of said cylinders, said pistons co-operating with said ports and ducts to open and close the same, connecting rods connected one to each of said pistons, a shaft rotatably supported on a fixed axis and having a crank pin operating in said inlet chamber and connected to the inner free ends of said connecting rods, an eccentric sleeve rotatably mounted on the crank pin and engaging the inner ends of said connecting rods, means for locking said eccentric sleeve in adjusted positions on said crank pin, means for indicating the relative rotative relation of said crank pin and eccentric sleeve, and means connected with said crank adapted to be connected to an indicating means to indicate the volume flow of the fluid.

4. In a fluid meter, a fluid inlet chamber, a plurality of measuring cylinders spaced around said inlet chamber and open at the inner ends thereof, an outlet chamber having a port opening in each of said cylinders, said cylinders each having a duct connecting one end with the opposite end of the next adjacent cylinder, separately operable valving pistons arranged one in each of said cylinders, and co-operating with said ports and ducts to open and close the same, connecting rods connected at one end to each of said pistons, a shaft rotatably mounted and having a crank pin operating in said inlet chamber and connected to the other ends of said connecting rods, an eccentric sleeve rotatably mounted on the crank pin and engaging the said other ends of said connecting rods, a lock washer non-rotatably and slidably mounted on the crank pin and engaging one end of said eccentric sleeve, a lock nut threaded on the crank pin and engaging said lock washer to lock the eccentric sleeve against the face of the crank, and means connected with said crank adapted to be connected with means for indicating the volume flow of the fluid.

5. In a fluid meter, a fluid inlet chamber, a plurality of measuring cylinders spaced around said inlet chamber and open at one end thereto, an outlet chamber having a port opening in each of said cylinders, said cylinders each having a duct connecting one end with the opposite end of the next adjacent cylinder, separately operable valving pistons arranged one in each of said cylinders, and co-operating with said ports and ducts to open and close the same, connecting rods connected at one end to each of said pistons, a shaft rotatably mounted and having a crank pin operating in said inlet chamber and connected to the other ends of said connecting rods, an eccentric sleeve rotatably mounted on the crank pin and engaging the said other ends of said connecting rods, said sleeve having a portion concentric with the crank pin, said concentric portion having a row of indicating marks thereon, a lock washer non-rotatably and slidably mounted on the crank pin and having an indicating mark thereon to register with the marks on said sleeve, a lock nut threaded on the crank pin and adapted to jam said sleeve into locking engagement with the crank, and means connected with the crank adapted to be connected with means for indicating the volume flow of the fluid.

6. A casing, comprising a plurality of cylinders extending radially from a central inlet chamber and having their axes in a common duct formed in plane, ducts formed in said casing having ducts formed therein and arranged on one side of each of said cylinders, said ducts having their outer ends communicating with the outer ends of the cylinders and their inner ends communicating with the inner ends of the immediately adjacent cylinder on the side opposite to the duct in said adjacent cylinder, separately movable pistons arranged one in each of said cylinders, each having a recess in the periphery thereof adapted on the movement of the piston inwardly to communicate with the duct leading to the outer end of the adjacent cylinder, an outlet chamber in said casing separate from the inlet chamber and having ports arranged one in the wall of each cylinder, said ports being adapted to register with the recesses in the pistons at the period when said recesses register with the ducts leading to the outer end of the cylinders, said recesses being arranged in relation to the inward ends of the pistons to open the ducts communicating with the outer ends of the adjacent cylinders immediately following the close of said ducts to the central inlet chamber, a connecting rod pivotally connected to each of said pistons, a shaft rotatably mounted and having a crank mounted in said casing and operatively connected with the inner ends of all of said connecting rods, and means for adusting the throw of said crank in relation to said connecting rods and pistons.

7. A casing having a centrally arranged fluid inlet chamber provided with a duct leading thereto at one side thereof, said casing having an outlet chamber arranged therein at the side of the inlet chamber opposite to its inlet duct, said outlet chamber having a duct leading therefrom, the wall separating said inlet and outlet chamber having a boss, a shaft rotatably mounted in said boss, a crank disc mounted on the end of said shaft within the inlet chamber, a crank pin mounted in said crank disc, a plurality of cylinders radially arranged in and forming part of said casing and having their inner ends open to said inlet chamber, ducts leading from said inlet chamber to the outer ends of said cylinders, ducts leading from said cylinders to said outlet chamber, valving pistons operating in said cylinders and controlling the inflow and outflow of fluid through said ducts to and from said cylinders, connecting rods connecting said pistons with said crank pin, a train of gears operatively connected with said shaft, and a spindle extending outwardly thru the casing from said train of gears and adapted to operate an indicating device.

WILLIAM H. D. BROUSE.